US006779805B1

(12) United States Patent
Marcus

(10) Patent No.: US 6,779,805 B1
(45) Date of Patent: Aug. 24, 2004

(54) BASS AND VIOL HAND CART

(76) Inventor: George L. Marcus, 247 St. James Pl., Apartment #3, Brooklyn, NY (US) 11238

( * ) Notice: Subject to any disclaimer, the term of this patent is extended or adjusted under 35 U.S.C. 154(b) by 0 days.

(21) Appl. No.: 09/658,278

(22) Filed: Sep. 8, 2000

Related U.S. Application Data

(60) Provisional application No. 60/160,196, filed on Oct. 19, 1999.

(51) Int. Cl.[7] .............................................. B62B 3/00
(52) U.S. Cl. ..................................... 280/79.11; 84/280
(58) Field of Search ............................ 280/79.11, 79.3, 280/79.7, 62; 248/129, 154; 84/280; 403/83, 101, 363, 381

(56) References Cited

U.S. PATENT DOCUMENTS

| 430,562 | A | | 6/1890 | Berry et al. | |
|---|---|---|---|---|---|
| 683,526 | A | * | 10/1901 | Tyndall | 280/62 |
| 886,537 | A | * | 5/1908 | McNiven | 280/62 |
| 918,819 | A | * | 4/1909 | Bowers | 280/62 |
| 1,335,796 | A | | 4/1920 | Robinson | |
| 1,474,212 | A | | 11/1923 | Statham | |
| 1,890,729 | A | * | 12/1932 | Ganson | 403/83 |
| 2,509,229 | A | | 3/1950 | Miller | |
| 2,736,225 | A | | 2/1956 | Marcus | |
| D185,058 | S | * | 5/1959 | Ball | D34/18 |
| 3,702,051 | A | * | 11/1972 | Deines | 56/11.3 |
| 4,512,680 | A | * | 4/1985 | Tomaszewski | 403/363 |
| D298,041 | S | | 10/1988 | Chang | |
| 5,208,409 | A | | 5/1993 | Roulet | |
| 5,464,236 | A | | 11/1995 | Benting et al. | |
| 6,024,402 | A | * | 2/2000 | Wheatley | 296/100.18 |
| 6,155,524 | A | * | 12/2000 | Legler et al. | 403/381 |
| 6,206,451 | B1 | * | 3/2001 | Maano | 296/136 |

FOREIGN PATENT DOCUMENTS

| EP | 287520 | 10/1988 |
|---|---|---|
| GB | 752398 | 7/1956 |
| JP | 07222705 | * 8/1995 |

* cited by examiner

Primary Examiner—Christopher P. Ellis
Assistant Examiner—Christopher Bottorff
(74) Attorney, Agent, or Firm—Richard C. Litman

(57) ABSTRACT

A bass and viol hand cart includes a base plate having three caster wheels and an engaging frame secured to the top surface of the base plate. The frame has a rail, and a pair of engaging structures are disposed on each end. Each end structure includes a U-shaped bail which is adjustably and pivotally connected to a pair of adjustable stands. A compression spring is mounted substantially at the center of the base plate with a flat socket for mounting a bass or viol on the cart. The bails are operatively manipulated inwardly until padded bight portions are received in the bow recesses disposed on each side of the bass or the viol and the bails are pushed down until the padded portions firmly engage the bottom sides of the bow recesses.

6 Claims, 4 Drawing Sheets

BASS AND VIOL HAND CART

CROSS-REFERENCE TO RELATED APPLICATION

This application claims the benefit of U.S. Provisional Patent Application Serial No. 60/160,196, filed Oct. 19, 1999.

BACKGROUND OF THE INVENTION

1. Field of the Invention

The present invention relates to carriers for musical instruments. More specifically, the invention relates to a mobile cart for use in the transport of large stringed instruments, such as basses and cellos.

2. Description of Related Art

Numerous support devices have been devised for providing effective and safe means for transporting and manipulating objects which are difficult to carry by hand. Some of the most significant advances in the art have centered around the development of carts or similar small devices for assisting in the difficult but often developments have focused on handling devices by which an individual person may tip or otherwise change the physical orientation of an object in space so that work may be done or some objective accomplished. The conventional techniques described below generally have attempted to provide a frame, base, or other structure for enabling a user to engage or lock an object into place to affect positional change or movement. And these devices exploit well known means such as rollers or a fulcrum and lever to achieve their respective aims and purposes. However, few devices have come close to adequately addressing the problems of moving fragile or easily damaged objects, such as large stringed instruments. Flat and irregular surfaces, such as stairs, as well as unexpected obstacles and difficult bystanders, can make the transport of basses and viols an inordinately difficult process, where serious and expensive damage can occur. Even on a perfectly flat surface, such as the stage of a great theater, when the orchestra marches off and is still playing, the bassist may be left ignominiously behind. And so some of the important advances to address this problem have centered around the development of mobile devices which allow the instrument to be moved from one place to another. But none of these innovations is completely suitable and safe for handling basses and viols, primarily because of their inability to adjustably receive and firmly hold on to their sequestered instruments. The bass and viol hand cart herein described alleviates the need for an effective and safe carrier for basses and large viols.

For example, the U.S. Pat. No. 2,736,225, issued to Marcus, discloses a cart for supporting a bass viol or double bass instrument, comprising a base plate with caster wheels and a viol engaging frame. While this device allows its user to efficiently move bass instruments, it is insufficient in that it is unable to enclose instruments of different sizes and shapes because of the limited range of the bails or clamping arms of the engaging frame. This problem arises because the standards which support the bails are not adjustable in relation to the supporting base plate. This limitation of range prevents the bails from enjoying full lateral movement and thereby lessons the ability of this device to tightly clamp and hold a variety of different sized instruments placed therein.

U.S. Pat. No. 5,464,236, issued to Benting et al., discloses a mobile cart for storage and transport of instruments, comprising a base frame supported by a floor engaging wheel assembly, a pair of fixed shelves, and expandable shelf assemblies. The British Patent granted to Mathews (BR 752,398), shows an improvement in hand trucks comprising a pivoted loop member carried by the frame of the truck and adapted to be raised or lowered into engagement with a drum. And U.S. Pat. No. 1,474,212, issued to Statham, discusses a radiator-support stand comprising a tubular supporting base in which a standard is vertically adjustable by means of a clamping collar and a tightening handle.

U.S. Pat. No. 5,208,409, issued to Roulet, discloses an adjustable shoulder support piece for violins. U.S. Design Patent No. 298,041, issued to Chang, shows an the ornamental design for an adjustable support stand for a musical instrument. The French Patent granted to Roulet (FR 287, 520), illustrates a support for violins. U.S. Pat. No. 430,562, issued to Berry and Wheeler, presents a hinged, portable barrel-rack. And U.S. Pat. No. 1,335,796, issued to Robinson, shows a barrel tipping device.

U.S. Pat. No. 2,502,229, issued to Miller, discusses a bass viol stand for supporting a bass viol, comprising a base adapted to rest on the floor and extending sufficiently to provide a stable support. The base comprises a central hub or housing having a projection or pin extending upward therefrom, which is shaped to fit the socket normally provided at the bottom of a double bass or cello for receiving the support rod normally employed therewith. The pin is mounted at a universal joint on the base and is movable from vertical to limited inclined positions in any direction. The stand also comprises clamping means for holding the pin in any chosen position. But though this invention is provided with means for modifying the stand so that it can be used for either a double bass or cello, the ball and socket joint are arranged to collapse together when the stand is lifted from the floor and so the invention is not optimally designed to facilitate movement of a musical instrument.

None of the above inventions and patents, taken either singly or in combination, is seen to describe the instant invention as claimed.

SUMMARY OF THE INVENTION

The bass and viol hand cart according to the invention comprises a base plate having three caster wheels disposed on its bottom surface to provide a tripod type support for the cart and an engaging frame secured to the top surface of the base plate. The frame comprises a rail extending along the side and end edges of the plate substantially parallel to and spaced from the plate and supported on the plate by spaced apart legs or angle brackets, as well as a pair of instrument engaging structures disposed on each end. The two end structures each comprise two standards, which are held in spaced apart and substantially parallel relationship to each other by brace bars. A U-shaped bail is adjustably and pivotally connected to each pair of standards. A compression spring is mounted substantially at the center of the base plate with a flat socket carried on the end of the spring remote from the base plate. In order to mount the bass on the cart, the stick projecting from the bottom of the bass or viol is removed, and the stick receiving boss on the bottom of the bass viol is placed in a socket positioned on the center of the base plate. The bails are then moved inwardly until the padded bight portions are received in the bow recesses disposed on each side of the bass or viol and the bails are pushed down until the padded portions firmly engage the bottom sides of the bow recesses, slightly compressing the spring.

At their ends, remote from the base plate, the standards are provided with apertures for receiving a bolt which extends through a spacer sleeve disposed between the standards. The opposite ends of the standards have foot portions for mounting the standards onto the surface of the base plate. Each foot portion has an aperture disposed therethrough for receiving the shaft of a screw. A channel for receiving the screw is disposed on each corner of the base plate, allowing the standards to be longitudinally adjustable along the length of the channel. The channel extends through the base plate but, in an alternative embodiment, is substantially C-shaped in cross section, enclosing the head of the aforementioned screw.

It is to be understood that the present invention is not limited to the sole embodiments described above, but encompasses any and all embodiments within the scope of the following claims.

Accordingly, it is a principal object of the invention to provide an improved bass and viol hand cart for transporting basses, violins, and similar musical instruments.

It is another object of the invention to provide a new bass and viol hand cart having a fully adjustable engaging frame adapted for firmly and safely holding a bass or viol to protect them against shaking or other vigourous movement during use of the hand cart.

It is another object of the invention to provide a new bass and violin hand cart which is of durable and reliable construction.

Yet another object of the present invention is to provide a new bass and violin hand cart which will confidently and reliably retain basses, violins, and similar musical instruments when secured therein.

And yet a further object of the present invention is the provision of a new bass and violin hand cart which will eliminate the need for other and often less effective bass and violin hand carts.

And still another object of the present invention is to provide a new bass and violin hand cart which is substantially maintenance free.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a bass and viol hand cart or mobile for transporting a bass or viol over a surface. The preferred embodiment of the present invention is depicted in FIGS. 1–4, and is generally referenced by numeral 5.

Figure 1:
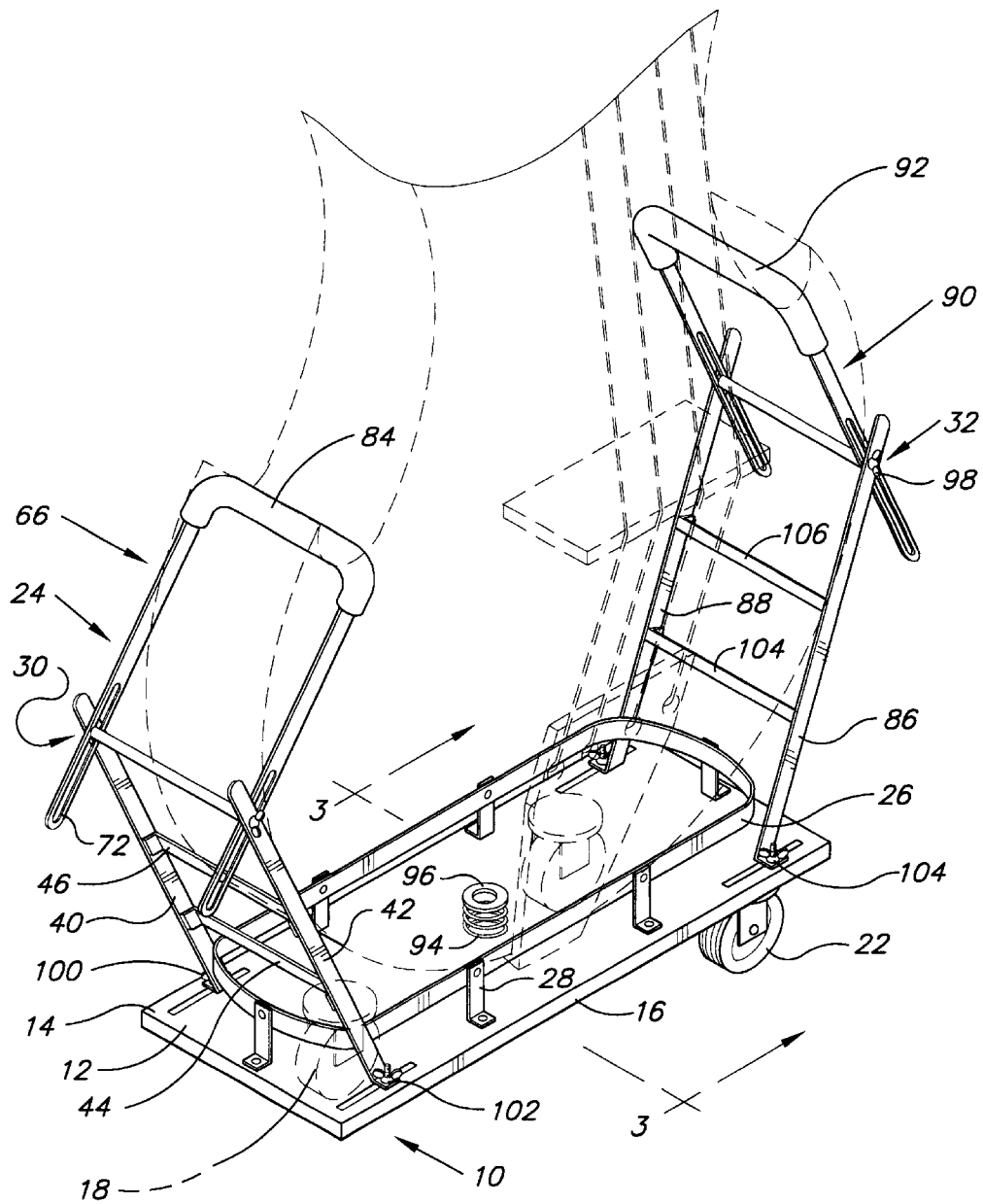
FIG. 1 is an environmental, perspective view of a bass and viol hand cart according to the present invention.
Figure 2:
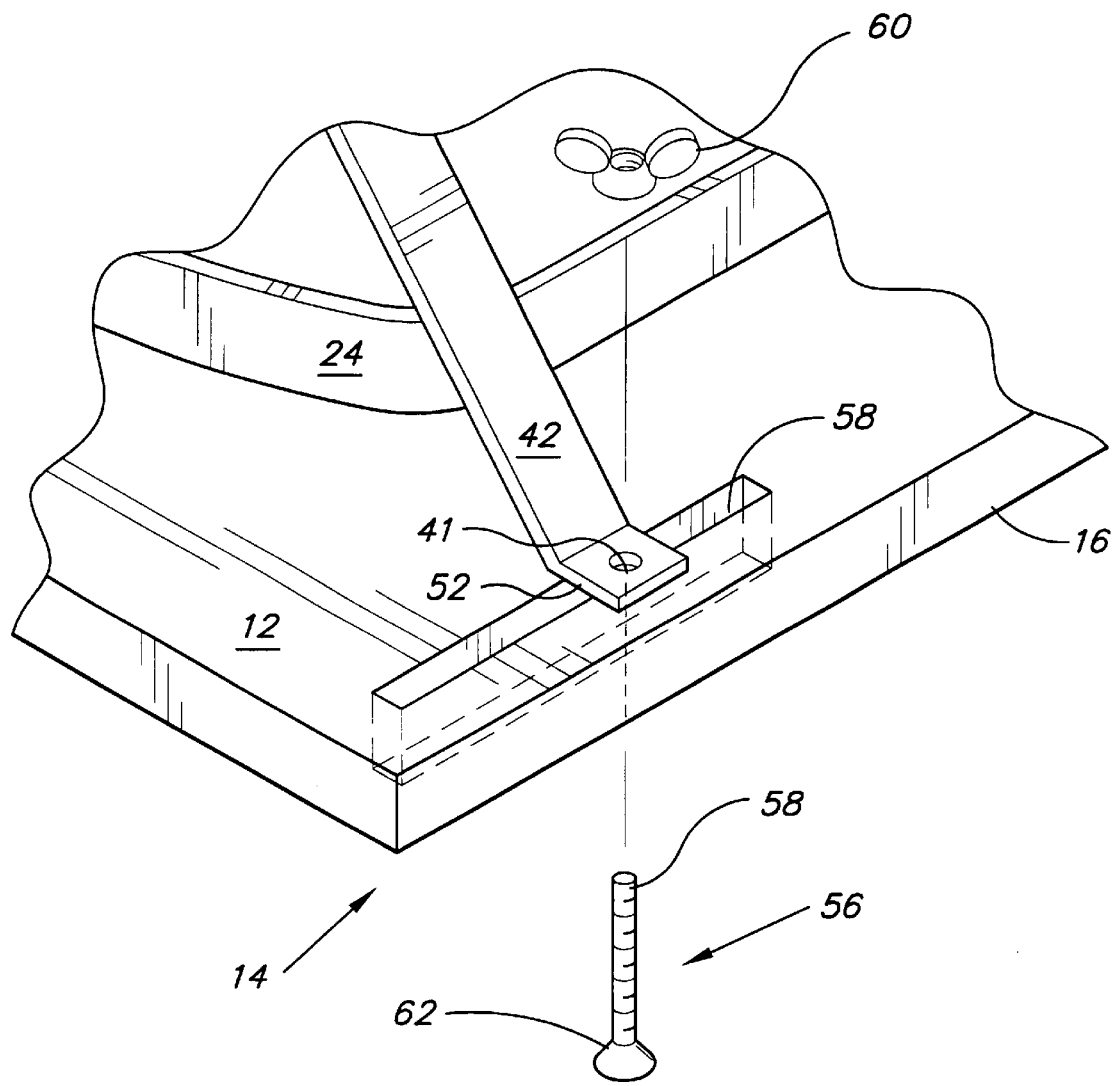
FIG. 2 is a cross sectional, enlarged view of the bass and viol hand cart according to the present invention.
Figure 3:
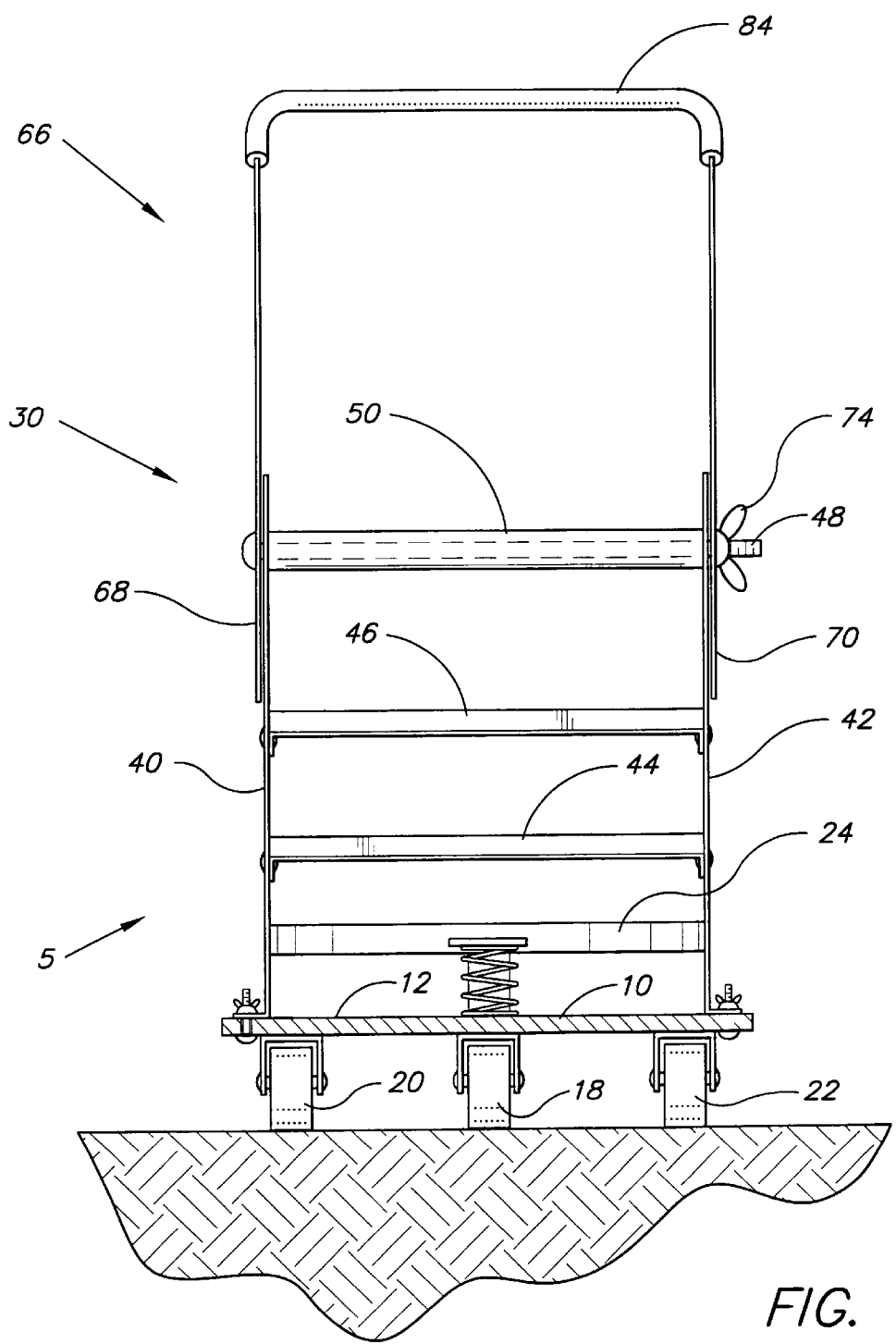
FIG. 3 is a side elevational perspective view of the bass and viol hand cart, a portion being broken away and shown in cross section along line 3—3, according to the invention.

As diagrammatically illustrated in FIG. 1, a bass and viol hand cart 5 is depicted in which the phantom outline of a bass or viol, secured therein, is seen. The bass and viol hand cart comprises a base plate 10 of generally rectangular, or square, shape, having a top surface 12, a bottom surface (not shown), four corners 14 and four lateral sides 16. Three caster wheels, 18, 20, and 22, are disposed under the base plate 10, secured to the bottom surface (not shown) of the base plate 10 for supporting the base plate 10, and an engaging frame 24 secured to the top surface 12 of the base plate 10.

The wheel 18 is mounted on the bottom surface (not shown) of the base plate 10 near one end and substantially at the mid-portion of the plate 10, and the wheels 20 and 22 are mounted on bottom surface (not shown) of the base plate 10 at the other end and near each lateral side of the plate, to provide a tripod type support for the cart.

The frame comprises a rail 26, preferably in the form of a metal strap of elongated, rectangular cross-sectional shape extending along the side and end edges of the plate 10 spaced from and substantially parallel to the plate 10 and supported on the plate 10 by spaced apart legs or angle brackets 28 and further includes a pair of instrument engaging structures, generally indicated at 30 and 32, disposed one near each end of the base plate 10 and projecting from the top surface 12 of the base plate 10.

As the two end structures 30 and 32 are substantially identical, a detailed illustration and description of one is sufficient for the purpose of this disclosure. Therefore, the end structure 30 is selected for such detailed illustration and description. As is particularly illustrated in FIG. 3, the end structure 30 is disposed transversely of the plate 10 at a location spaced from the adjacent end of the plate 10. The end structure 30 comprises two standards 40 and 42 disposed in spaced apart and substantially parallel relationship to each other, and each connected at one end to the top surface 12 of the base plate 10. The standards 40 and 42 are inclined upwardly and outwardly away from the mid-length location of the plate 10 and are held in their spaced apart and substantially parallel relationship to each other by brace bars 44 and 46 which extend between the standards 40 and 42 and are secured at their ends thereto. The brace bar 46 is disposed near the ends of the standards 40 and 42 remote from the base plate 10 and substantially perpendicular to both standards 40 and 42, while the brace bar 44 is disposed between the upper brace bar 46 and the base plate 10 and is also substantially perpendicular to both of the standards 40 and 42.

At their ends remote from the base plate 10 the standards 40 and 42 are provided with apertures for receiving a bolt 48, and this bolt extends through a spacer sleeve 50 disposed between the standards 40 and 42 at the upper ends thereof.

As each of the four standards are substantially identical, a detailed illustration and description of one is sufficient for the purpose of this disclosure, the standard 42 having been selected for detailed illustration and description. As clearly seen in FIG. 2, it will be noted that the standard 42 is not secured to the rail 24, but is adjustably and slideably secured to the base plate 10, by means of a foot portion 52 integrally formed as a part of the standard 42 extending from the end of the standard 42. The foot portion 52 has an aperture 41 disposed therethrough for receiving the shaft 54 of a screw 56. A longitudinal channel 58, which is located on the corner 14 of the base plate 10, extends through the base plate 16 for receiving the shaft 54 of the screw 56, allowing the standard 42 to be moved to whatever position most suitably accommodates the shape and size of the selected musical instrument. A wing nut 60 is threaded onto the other end of the screw 56 to clamp the standard 42 in whatever position the user selects. The top surface 12 of the base plate 10 may be coated or made of any appropriate material to insure that the standard 42 slides across the top surface 12 but is not so frictionless a contact that the standard 42 easily slips or is detached when fastened down. The head 62 of the screw 46 is conical in shape to better distribute the natural stress or shearing forces on the screw head 62 during use of the cart 5. This adjustable standard 42 provides an important advance over the prior art, allowing the invention to be used with a variety of different stringed musical instruments, as indicated by the phantom lines in FIG. 1. This critical design feature permits the standards to have full lateral or sideways movement, allowing instruments to be much more securely held as the standards can be more intimately positioned adjacent to the surfaces of instruments of different or even asymmetric sizes. This improvement provides a significant contribution to the prior art because the slightest laxity in the accommodation of the device when the instrument is placed therein can result in the instrument being subjected to jarring motions against the engaging frame 24 during transport, resulting in severe damage and economic and even personal loss to the owner.

Figure 4:
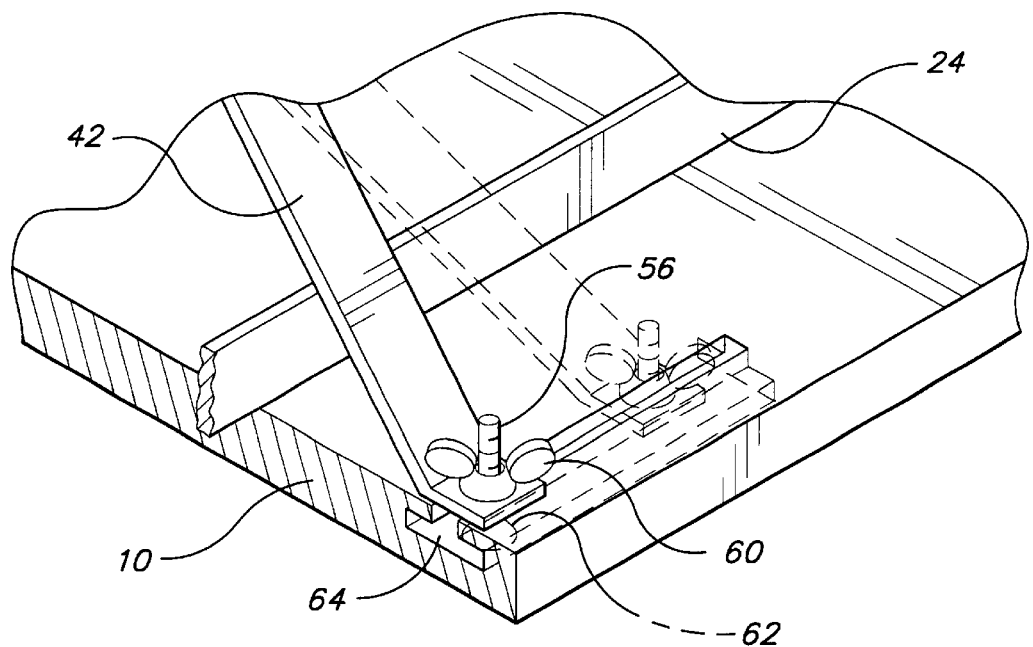
FIG. 4 is a sectional view of the bass and viol hand cart, according to a second embodiment of the invention.

In an alternative embodiment as illustrated in FIG. 4, the channel 64 is substantially C-shaped in cross section, also having a screw 56, the head 62 of which is retained in the channel 64, and wing nut 60 for fastening the standard 42 onto the top surface 12 of the base plate 10. The channels 58 and 64 may be formed during the molding process or cut into the top surface 12 of the base plate 10 during manufacturing.

Referring again to FIG. 3, a U-shaped bail 66 has the end of one of its legs 68 at the open end of the bail 66 disposed at the outer side of the upper end portion of the standard 40, and the corresponding end of its other leg 70 disposed at the outer side of the upper end portion of the other standard 42. At the open end of the bail 66 the legs 68 and 70 are provided with elongated slots, as indicated at 72 in FIG. 1, extending longitudinally thereof, which slots receive the bolt 48 to pivotally and adjustably connect the bail 66 to the standards 40 and 42. The bolt 48 has a head at one end bearing against one of the legs 68 and a wing nut 74 is threaded onto the other end of the bolt to clamp the bail 66 in selected positions of adjustment relative to the standards 40 and 42. A tubular cushion 84 of a suitably resilient material, such as soft rubber, receives the bight portion of the bail 66 for a purpose to be presently described.

Referring again to FIG. 1, the end structure 32 has corresponding standards 86 and 88, a bail 90 corresponding to the bail 66, and having a tubular pad 92 thereon, and a bolt (not shown) pivotally and adjustably connecting the bail to the standards 88 and 86 at the upper ends. And the standards 40, 42, 86, and 88 have screw and nut assemblies 100, 102, 104, and 106, respectively, for firmly securing the standards 40, 42, 86, and 88 to the base plate 10. Brackets 104 and 106, disposed between standards 86 and 88, are also shown.

A compression spring 94 is mounted on the base plate 10 substantially at the center of the top surface 12 of the base plate 10 and a flat socket 96 is carried on the end of the spring 94 remote from the base plate 10.

The dashed outline of a bass or viol mounted on a bass and viol hand cart 5 is illustrated in FIG. 1, where the stick projecting from the bottom of the bass or viol has been removed and the stick receiving boss on the bottom of the bass or viol has been placed in the socket 96. The standards 40, 42, 86, and 88 are then moved along the length of their respective channels to a position immediately adjacent to the sides of the bass or viol and firmly secured thereto by tightening their respective screw and nut assemblies 100, 102, 104, and 106. The bails 66 and 90 are then moved inwardly until the padded bight portions 84 and 92 are received in the bow recesses disposed one at each side of the bass viol and, with the nuts 48 and 98 on the bolts loosened, the bails 30 and 32 are then pushed down until the padded portions 84 and 92 thereof firmly engage the bass or viol at the bottom sides of the corresponding bow recesses slightly compressing the spring 92. The nuts 48 and 98 are then tightened and the bass or viol is firmly secured in position on the cart 5.

The bass or viol and the cart 5 may now be moved along a flat surface, such as a floor or sidewalk, by grasping the neck of the bass or viol and tilting the bass or viol and the cart 5 so that only the caster wheels 20 and 22 are in contact with the supporting surface. The instrument with the attached cart 5 may now be pulled along the flat supporting surface and when it becomes necessary to lift the instrument, as when a curb or steps are encountered, the instrument and cart 5 will be both lifted by raising the neck of the instrument. When the neck of the instrument is released, the third caster wheel 18 will come into contact with the supporting surface and the three wheels, 18, 20, and 22, will support the instrument in upright position. In an alternative embodiment, the standards 40, 42, 86, and 88 may have fastening means for securing the standards 40, 42, 86, and 88 to the rail 26 after placing the bass or viol on the cart 5 to provide additional support to the musical instrument held therein. These fastening means may include a screw and nut assemblies disposed through mating aperatures on the rail 26 and standards 40, 42, 86, and 88.

The standards 40, 42, 86, and 88, the brace bars 44, 46, 104, and 106, the bails 30 and 32, and the rail 26 and supporting legs 28 are all preferably formed of light-weight, flat metal stock, so that the cart 5, while strong and rigid, has very little weight and can be easily carried along with the instrument. The spring 92 and the resilient pads 84 and 92 protect the instrument from damage or shock while supported on the cart 5.

It is to be understood that the present invention is not limited to the sole embodiments described above, but encompasses any and all embodiments within the scope of the following claims.

I claim:

1. An instrument hand cart for a bass or viol comprising:
   a base plate, three caster wheels, and two end structures, said base plate comprising a top surface, a bottom surface, four sides, and four corners, said base plate defining a longitudinal channel proximate each of said four corners;
   said caster wheels secured to said bottom surface of said base plate, extending from said base plate in spaced apart relationship to each other;
   said end structures being secured to said base plate, one near each end thereof and projecting from said top surface of said base plate in divergent relationship to each other;
   each of said end structures having a first portion secured at one end to said base plate and a bail pivotally secured at its open end to said first portion at the other end of said first portion;
   each of said bails comprising two substantially parallel bail legs, each of said bail legs having upper and lower bail leg ends, said upper bail leg ends of each of said bails being connected by a tubular padded connecting rod;

each of said first portions comprising two substantially parallel standards, each of said standards having upper and lower standard ends, said upper standard ends being pivotally and adjustably secured to said lower bail leg ends by means of a bolt having a tubular pad disposed thereon;

each of said lower standard ends having a foot portion substantially perpendicular thereto, each said foot portion having an aperture disposed therethrough for receiving a screw for connecting to said base plate, each of said standard ends being positionable along each said channel, wherein said channel is dimensioned to receive said screw for adjustably mounting said standard along the length of said channel at selective positions so that said standards are arranged immediately adjacent to the sides of a bass or viol for securing the bass or viol to said cart; and, a compression spring mounted on said base plate at the center of said top surface of said base plate, and a socket carried by said spring in spaced relationship to said base plate, said socket being adapted to receive the bottom end boss of a bass viol, said bails being adapted to hook into the bow recesses thereof.

2. The bass and viol hand cart according to claim 1, wherein each said channel is disposed entirely through said base plate.

3. The bass and viol hand cart according to claim 1, wherein each said channel is substantially C-shaped in cross section and within the body of said base plate.

4. The bass and viol hand cart according to claim 1, wherein a rail extends along the edges of said base plate in spaced and substantially parallel relationship to the top surface of said base plate, and angle brackets support said rail from said base plate.

5. The bass and viol hand cart according to claim 1, wherein brackets extend between said standards.

6. The bass and viol hand cart according to claim 5, wherein said brackets have a pad disposed thereon for protecting the exterior surface of a bass or viol when secured therein.

* * * * *